United States Patent
Gerhardt

(10) Patent No.: US 10,118,357 B2
(45) Date of Patent: Nov. 6, 2018

(54) HOLDER FOR ARRANGING A FOIL ON A MOLD SURFACE OF A SIDEWALL SHELL OF A VULCANIZING MOLD AND A VULCANIZING MOLD HAVING SUCH A HOLDER

(71) Applicant: Continental Reifen Deutschland GmbH, Hannover (DE)

(72) Inventor: Joachim Gerhardt, Barsinghausen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/867,489

(22) Filed: Jan. 10, 2018

(65) Prior Publication Data

US 2018/0194094 A1     Jul. 12, 2018

(30) Foreign Application Priority Data

Jan. 10, 2017 (DE) ........................ 10 2017 200 284

(51) Int. Cl.
| | |
|---|---|
| B29D 30/06 | (2006.01) |
| B29D 30/72 | (2006.01) |
| B29C 33/42 | (2006.01) |
| B29C 33/30 | (2006.01) |

(52) U.S. Cl.
CPC ......... *B29D 30/72* (2013.01); *B29D 30/0606* (2013.01); *B29C 33/306* (2013.01); *B29C 33/424* (2013.01); *B29D 30/0662* (2013.01); *B29D 2030/726* (2013.01)

(58) Field of Classification Search
CPC ............ B29D 30/0606; B29D 30/0662; B29D 30/72; B29D 2030/726; B29C 33/306; B29C 33/424; B60C 13/001
See application file for complete search history.

(56) References Cited

U.S. PATENT DOCUMENTS 1,567,402 A * 12/1925 Venn ..................... B29C 33/424
                                                                          152/523
2,296,016 A * 9/1942 Bostwick .............. B29C 33/424
                                                                          264/293

(Continued)

FOREIGN PATENT DOCUMENTS

| CA | 2190720 A1 | 5/1997 |
|---|---|---|
| DE | 10 2009 059 253 | * 6/2011 |

(Continued)

*Primary Examiner* — James P Mackey
(74) *Attorney, Agent, or Firm* — Walter Ottesen, P.A.

(57) ABSTRACT

A holder is for arranging a foil on the mold surface of a sidewall shell of a vulcanizing mold. The holder has a sleeve which can be pressed into a bore in the sidewall shell and, arranged in the sleeve, a helically-spring-mounted, coaxially movable pin. The pin has a pin head which, in an initial position, projects beyond an end of the sleeve with the force of the spring and on which a foil can be positioned on the mold surface. The pin, in an end position, is movable into the sleeve counter to the force of the spring such that the pin head end remote from the pin is aligned with the end of the sleeve. The pin head forms a clearance fit with the sleeve. The clearance fit is such that the pin is movable in the sleeve but no rubber material can ingress into the sleeve.

11 Claims, 2 Drawing Sheets

(56) References Cited

U.S. PATENT DOCUMENTS

| | | | |
|---|---|---|---|
| 4,547,139 A * | 10/1985 | Hershberger | B29D 30/0606 |
| | | | 425/192 R |
| 5,382,402 A * | 1/1995 | Espie | B29C 33/10 |
| | | | 156/394.1 |
| 6,942,476 B2 * | 9/2005 | Parmelee | B29C 33/32 |
| | | | 249/103 |
| 7,232,498 B2 | 6/2007 | Zimmer et al. | |

FOREIGN PATENT DOCUMENTS

| | | |
|---|---|---|
| DE | 102009059265 A1 | 6/2011 |
| EP | 0774333 A2 | 5/1997 |
| JP | 59-55730 * | 3/1984 |

* cited by examiner

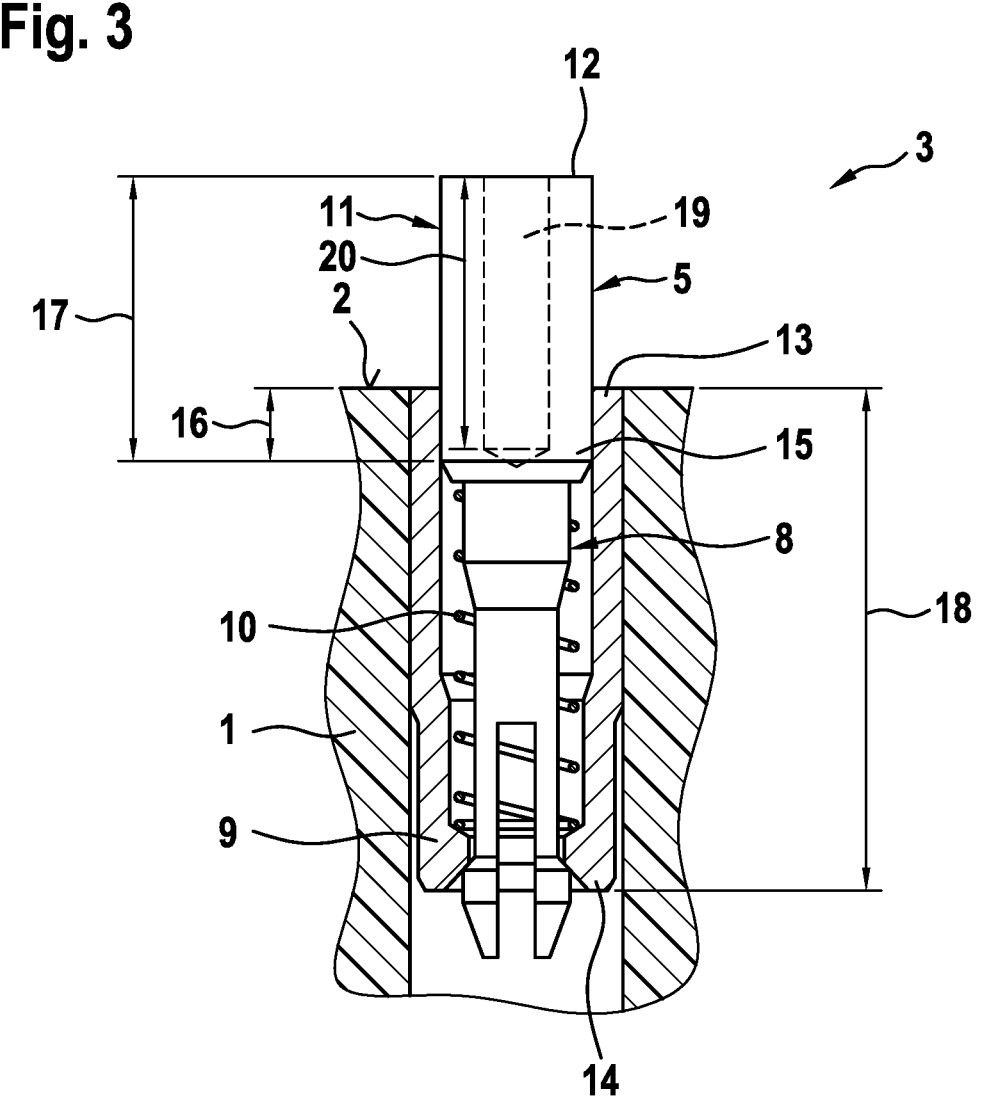

HOLDER FOR ARRANGING A FOIL ON A MOLD SURFACE OF A SIDEWALL SHELL OF A VULCANIZING MOLD AND A VULCANIZING MOLD HAVING SUCH A HOLDER

CROSS REFERENCE TO RELATED APPLICATION

This application claims priority of German patent application no. 10 2017 200 284.0, filed Jan. 10, 2017, the entire content of which is incorporated herein by reference.

FIELD OF THE INVENTION

The invention relates to a holder for the arrangement of a foil on the mold surface of a sidewall shell of a vulcanizing mold, having a cylindrical sleeve which can be pressed into a bore in the sidewall shell and having, arranged in the sleeve, a helical-spring-mounted, coaxially movable pin, the pin having, on one end thereof, a cylindrically formed pin head which, in an initial position, projects beyond the first end of the sleeve with the force of the helical spring and on which a foil can, via a corresponding punched-out portion, be positioned on the mold surface of the sidewall shell, and the pin, in an end position, being movable into the sleeve counter to the spring such that the pin head end remote from the pin is aligned with the first end of the sleeve.

BACKGROUND OF THE INVENTION

Tire sidewalls have labels. Here, "labels" encompass company names, company logos, color designations, information data, identification codes, hatching and the like.

The labels of the tire sidewall should exhibit high manufacturing quality, should provide an impression of high quality of the tire, and should visually highlight the tire in relation to other tires. This is achieved for example through the application of (coloured) foils to the tire sidewall. The foils have the labels.

As materials of the foils, which are also referred to as "rubber labels", use is made for example of elastomers, thermoplastic elastomers, thermoplastics or combinations of the abovementioned materials. The punched elastomer foils with imprinted plastics surface are of outstanding importance.

From U.S. Pat. No. 7,232,498, it is known for the tire sidewall to be equipped with rubber labels which are formed by a rubber foil which is approximately 1 mm in thickness and which is vulcanized onto the sidewall of the tire. The foil thickness range normally lies between 0.1 and 1.5 mm. The rubber labels are pressed under the action of pressure and heat onto the tire for labelling, and cure or vulcanize onto the tire. The rubber labels generally bear colored, printed-on text, figures, logos, technical information, brand names or the like. The rubber labels are positioned directly on the green tire via an adhesive layer, and then, in a vulcanizing mold, subjected to hot pressing together with the blank. The disadvantage is that an exactly predefined position of the rubber label relative to the tire sidewall engraving cannot be maintained.

DE 10 2009 059 265 A1, which forms the closest prior art, overcomes this disadvantage. The above-cited document discloses a holder and a vulcanizing mold which has this holder, on the sidewall shell of which vulcanizing mold a foil can be exactly positioned, which foil, when the vulcanizing mold is brought together for the hot pressing of the green tire, can be laid onto the sidewall of the green tire. During the vulcanization, a firm connection of the foil to the tire sidewall forms. The sidewall shell does not require any complex means for the arrangement of the foil on the sidewall shell, such as for example separate lateral receiving boundaries for the positioning of the foil which, as a groove in the tire, furthermore entirely or partially delimits the foil. Only at least two spring-mounted pins, which can be recessed into the body of the sidewall shell, are required in order for the foil, which has cutouts corresponding to the pins, to be exactly positioned via the pin heads in the cutouts. Having been securely fixed in a defined manner to the sidewall shell in this way, the foil can be transferred to the tire sidewall. The vulcanizing mold can be used even if no foil is placed into the vulcanizing mold. Aside from scarcely visible imprints of the face surfaces of the pins, no undesired imprints are formed on the tire sidewall.

It has however been found that, during the vulcanization of the green tire, the holder become partially blocked as a result of an ingress of rubber material between pin and sleeve, and thus the pin is no longer adequately movable. This can restrict the functionality of the holder. On the one hand, it could occur that the pin is restricted in terms of its mobility such that this pin does not protrude far enough beyond the sleeve with the force of the spring, such that the foil cannot be placed on the pin head; on the other hand, it could occur that the recessing of the pin into the sleeve is no longer possible, such that undesired imprints would form on the tire.

SUMMARY OF THE INVENTION

It is an object of the invention to provide a holder with which it should be possible for a foil to be arranged in an exactly positioned manner on the sidewall of the tire to be vulcanized, the holder, however, has a reduced tendency to become blocked with rubber material. It is furthermore an object to provide a corresponding vulcanizing mold having an abovementioned holder, which vulcanizing mold can be used more efficiently.

With regard to the holder, the object can, for example, be achieved in that the pin head, with its end facing toward the pin and in its initial position, forms a clearance fit with the sleeve, and in that the clearance fit between pin head and sleeve is selected such that the pin is movable in the sleeve but no rubber material can ingress between pin head and sleeve into the sleeve.

In this way, the ingress of rubber material of the green tire into the interior of the sleeve is prevented in an effective manner. The clearance fit forms a barrier to the ingress of the rubber material, but the mobility of the pin is maintained.

It is expedient if the clearance fit in the initial position is formed over a length of 0.8 to 2 mm, preferably over a length of 1.0 to 1.3 mm, wherein the length is measured parallel to the longitudinal axis in relation to the holder. In this way, the ingress of rubber material is prevented in an effective manner, but the mobility of the pin in the sleeve remains ensured.

It is advantageous if the pin head has a length of 2.5 to 5 mm, preferably a length of 4.0 to 4.3 mm, wherein the length is measured parallel to the longitudinal axis in relation to the holder. A length as mentioned above firstly yields the effective clearance fit and secondly provides an adequately long receiving portion for the foil.

It is expedient if the clearance fit in the end position between sleeve and pin head is formed over the entire length of the pin head.

It is expedient if the sleeve has a length in a range from 5 to 10 mm, preferably a length of 7.5 mm. In this way, the sleeve can be used in a versatile manner in a wide variety of different vulcanizing molds with different wall thicknesses.

It is advantageous if the pin head has a blind bore which is arranged coaxially with respect to the pin and which is formed at least over a depth which corresponds to 0.5× the length of the pin head. Via the blind bore, the holder can be freed up again using extremely simple means if it nevertheless becomes blocked with rubber material. The pin can be freed up via a tool which is inserted into the blind bore. The tool may also be a vibrating tool.

With regard to the vulcanizing mold, the object can, for example, be achieved in that this vulcanizing mold, in its sidewall shell, has at least one holder as per one or more of the preceding embodiments. The spring-mounted pin of the holder which is arranged in the sidewall shell of a vulcanizing mold for tires projects with its pin head, in its initial position and when the vulcanizing mold is open, beyond the mold surface of the sidewall shell into the cavity (into the mold cavity). The foil is arranged with corresponding punched-out portions on the pin head. When the vulcanizing mold is brought together, the green tire presses against the pins of the holder and comes into contact with the foil, which is laid onto the green tire, and the green tire pushes the pins of the holder in fully as the vulcanizing mold is brought together further, such that the pins are aligned with the mold surface.

The holder is a modified vent valve, which is used by the applicant as a so-called "Eurovent" for mold ventilation. With regard to the construction and mode of operation of this Eurovent, reference is made to the applicant's EP 0 774 333 B1. In particular, it is the intention for the dismountability of the pin of the Eurovent via a snap-action fastening to likewise be claimed for the holder.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
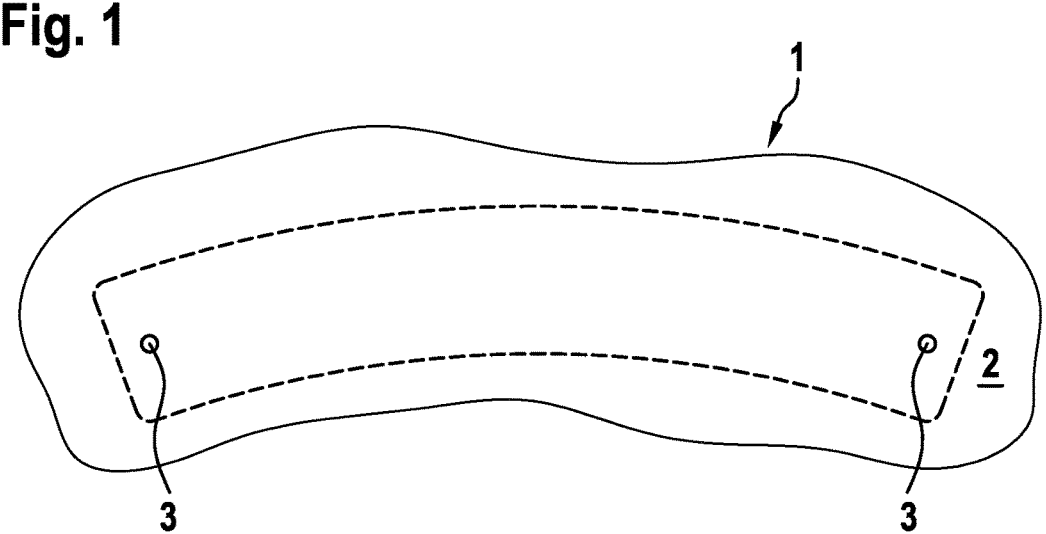
FIG. 1 shows a plan view of a detail of the mold surface of a sidewall shell having holder for a foil.

FIG. 1 shows a plan view of a detail of the mold surface 2 of a sidewall shell 1 of a vulcanizing mold for pneumatic vehicle tires, having holder 3 for a foil 4 (not illustrated here). When the vulcanizing mold is brought together, the foil 4 is applied to the sidewall of the green tire to be vulcanized in the vulcanizing mold.

Vulcanizing molds for pneumatic vehicle tires include a multiplicity of mold parts. Those mold parts which come into contact with the initially still non-vulcanized green tire must be constructed, arranged and movable such that the green tire can be introduced and the fully vulcanized tire can be removed. In the widely used type of vulcanizing mold as described in the figures, a number of mold segments arranged in the manner of a ring is provided, which mold segments mold the tire in the region of the tread and the shoulders and press the intended profiling into the tread via webs, lamellae and the like. Normally, six to eight mold segments which are movable in a radial direction are provided in a vulcanizing mold for passenger motor vehicle tires. Sidewall shells 1 which are arranged so as to be movable in an axial direction make contact, via mold surfaces 2 which run in circular-ring-shaped encircling fashion, with the tire to be vulcanized in the region of the sidewalls thereof, and this sidewall shells apply the labels of the sidewall, such as for example the sidewall configuration, the brand name and the dimension specifications, to the sidewalls.

The foil 4 is arranged on the sidewall shell 1 via two spring-mounted pins as holder 3. Modified vent valves serve as holder 3.

Figure 2:
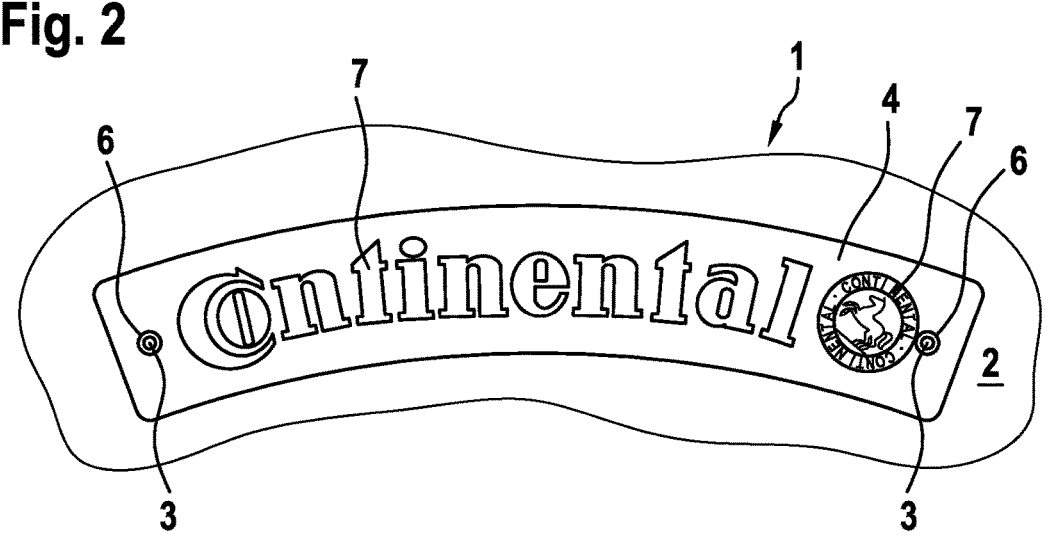
FIG. 2 shows a plan view of the detail of FIG. 1 with a foil laid onto the mold surface; and, FIG. 3 shows a longitudinal section through a holder for a foil.

FIG. 2 shows a plan view of the detail of FIG. 1 with a foil 4 laid onto the mold surface 2. The foil 4 is of sandwich-like construction and includes a rubber layer which is covered with a transparent plastics foil. The rubber layer is fixedly connected to the tire. The plastic foil is provided with labels 7 on the side which faces toward the rubber layer. The labels 7 are thus protected for example against scuffing, which could damage the labels 7. In FIG. 2, the foil 4 is, for the sake of clarity, arranged on the holder 3 such that the labels 7 are visible. In practice, however, the foil 4 is arranged on the holder 3 such that the labels 7 point toward the mold surface 2. The foil 4 has two cutouts 6. The cutouts 6, which are punched-out portions, have a greater diameter than the holder 3. The cutouts 6 are placed over the holder 3, in particular over the pin head 5. The cutouts 6 are arranged in a defined manner in relation to the labels 7—and not in relation to the outer contour of the foil—such that, even in the case of an oblique outer contour of the foil 4, the labels 7 of the foil 4 can be positioned in an exact and defined manner on the tire.

FIG. 3 shows a holder 3 for the arrangement of a foil 4 on the mold surface 2 of a sidewall shell 1 of a vulcanizing mold. The sidewall shell 1 and the mold surface 2 thereof are indicated. The holder 3 has a cylindrical sleeve 9 which can be pressed into a bore in the sidewall shell. A coaxially movable pin 8 which is mounted via a helical spring 10 is arranged in the sleeve 9. The pin 8 has, on one end 11 thereof, a cylindrically formed pin head 5 which, in an initial position, projects with the force of the helical spring 10 beyond the first end of the sleeve 13. On the pin head 5, a foil can be positioned, via a corresponding punched-out portion, on the mold surface of the sidewall shell. The pin 8 is movable in the sleeve 9 counter to the spring force and can thus be moved into an end position in which the pin head end 12 remote from the pin is aligned with the first end of the sleeve 13.

The pin head 5, via its lower region 15 facing toward the pin and in its initial position, forms a clearance fit with the sleeve 9. The clearance fit between pin head 5 and sleeve 9 is selected such that the pin 8 is movable in the sleeve 9, but no rubber material can ingress between pin head 5 and sleeve 9 into the sleeve.

In the initial position, the clearance fit is formed over a length 16 of 1.1 mm. The pin head 5 has a length 17 of 4.2 mm. In the end position (that is, with the pin recessed in the sleeve), the clearance fit between sleeve 9 and pin head 5 is formed over the entire length of the pin head 17. The sleeve 9 has a length 18 of 7.5 mm. The pin head 5 has a blind bore 19 which is arranged coaxially with respect to the pin 8 and which is formed at least over a depth 20 which corresponds to at least 0.5× the length of the pin head 17.

The holder 3 can be used for example in the sidewall shell of a vulcanizing mold. With two or more such holder 3, a foil can be positioned on the sidewall shell in an exact manner.

It is understood that the foregoing description is that of the preferred embodiments of the invention and that various changes and modifications may be made thereto without departing from the spirit and scope of the invention as defined in the appended claims.

LIST OF REFERENCE SIGNS

1 Sidewall shell
2 Mold surface
3 Holder
4 Foil
5 Pin head
6 Cutout
7 Label
8 Pin
9 Sleeve
10 Helical spring
11 Pin end
12 Pin head end
13 First end of the sleeve
14 Second end of the sleeve
15 Lower region of the pin head
16 Length of the clearance fit in the initial position
17 Length of the pin head
18 Length of the sleeve
19 Blind bore
20 Depth of the blind bore

What is claimed is:

1. A holder for the arrangement of a foil on a mold surface of a sidewall shell of a vulcanizing mold, the holder comprising:
a cylindrical sleeve configured to be pressed into a bore in the sidewall shell;
a helical spring;
a coaxially movable pin arranged in said sleeve and helically-spring-mounted via said helical spring;
said cylindrical sleeve having a first sleeve end;
said pin having a first pin end;
said pin having, on said first pin end, a cylindrically formed pin head which, in an initial position, projects beyond said first sleeve end with a force of said helical spring and on which a foil can, via a corresponding punched-out portion, be positioned on the mold surface of the sidewall shell;
said pin head having a first pin head end remote from said pin;
said pin, in an end position, being configured to be movable into said cylindrical sleeve counter to the force of said helical spring such that said first pin head end is aligned with said first sleeve end;
said pin head, with a pin head region facing toward the pin and in its initial position, being configured to form a clearance fit with said sleeve; and,
said clearance fit between said pin head and said sleeve being selected such that said pin is movable in said sleeve but no rubber material can ingress into said sleeve between said pin head and said sleeve.

2. The holder of claim 1, wherein said clearance fit in the initial position is formed over a length of 0.8 to 2 mm.

3. The holder of claim 1, wherein said clearance fit in the initial position is formed over a length of 1.0 to 1.3 mm.

4. The holder of claim 1, wherein said pin head has a length of 2.5 to 5 mm.

5. The holder of claim 1, wherein said pin head has a length of 4.0 to 4.3 mm.

6. The holder of claim 1, wherein said clearance fit in said end position between sleeve and pin head is formed over the entire length of the pin head.

7. The holder of claim 1, wherein said sleeve has a length lying in a range from 5 to 10 mm.

8. The holder of claim 1, wherein said sleeve has a length of 7.5 mm.

9. The holder of claim 1, wherein:
said pin head has a pin head length and a blind bore arranged coaxially with respect to said pin; and,
said blind bore is formed at least over a depth which corresponds to at least 0.5× said pin head length.

10. A vulcanizing mold comprising:
a sidewall shell having a mold surface;
a holder configured to arrange a foil on said mold surface of said sidewall shell of the vulcanizing mold;
said holder being disposed in said sidewall shell;
said holder having a cylindrical sleeve configured to be pressed into a bore in the sidewall shell;
a helical spring;
said holder further having a helically-spring-mounted, coaxially movable pin arranged in said sleeve;
said cylindrical sleeve having a first sleeve end;
said pin having a first pin end;
said pin having, on said first pin end, a cylindrically formed pin head which, in an initial position, projects beyond said first sleeve end with a force of said helical spring and on which the foil can, via a corresponding punched-out portion, be positioned on said mold surface of said sidewall shell;
said pin head having a first pin head end remote from said pin;
said pin, in an end position, being configured to be movable into said cylindrical sleeve counter to the force of said helical spring such that said first pin head end is aligned with said first sleeve end;
said pin head, with a pin head region facing toward the pin and in its initial position, being configured to form a clearance fit with said sleeve; and,
said clearance fit between said pin head and said sleeve being selected such that said pin is movable in said sleeve but no rubber material can ingress into said sleeve between said pin head and said sleeve.

11. The vulcanizing mold of claim 10, wherein the vulcanizing mold includes at least two of said holders arranged in said sidewall shell.

* * * * *